(12) United States Patent
Kim et al.

(10) Patent No.: US 9,766,424 B2
(45) Date of Patent: Sep. 19, 2017

(54) CAMERA MODULE

(71) Applicant: LG INNOTEK CO., LTD., Seoul (KR)

(72) Inventors: Nae Seong Kim, Seoul (KR); Seong Cheol Jeong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 25 days.

(21) Appl. No.: 14/485,167

(22) Filed: Sep. 12, 2014

(65) Prior Publication Data

US 2015/0077840 A1    Mar. 19, 2015

(30) Foreign Application Priority Data

Sep. 13, 2013 (KR) .................. 10-2013-0110223
Nov. 5, 2013 (KR) .................. 10-2013-0133491
Nov. 5, 2013 (KR) .................. 10-2013-0133495

(51) Int. Cl.
| | |
|---|---|
| H04N 5/225 | (2006.01) |
| G02B 7/08 | (2006.01) |
| H02K 41/03 | (2006.01) |
| G02B 7/02 | (2006.01) |
| G02B 27/00 | (2006.01) |

(52) U.S. Cl.
CPC .............. G02B 7/08 (2013.01); H02K 41/031 (2013.01); H04N 5/2254 (2013.01); H04N 5/2257 (2013.01); G02B 7/025 (2013.01); G02B 27/0018 (2013.01)

(58) Field of Classification Search
CPC ...... G02B 7/08; H02K 41/031; H04N 5/2254; H04N 5/2257
USPC .................................................. 348/373–376
See application file for complete search history.

(56) References Cited

U.S. PATENT DOCUMENTS

| | | | |
|---|---|---|---|
| 2003/0174332 A1* | 9/2003 | Kwon ................... | G01N 21/59 356/437 |
| 2004/0109079 A1* | 6/2004 | Fujimoto ............... | G02B 7/021 348/340 |
| 2007/0045550 A1* | 3/2007 | Nakajo ................. | G02B 13/005 250/370.08 |

FOREIGN PATENT DOCUMENTS

| | | | |
|---|---|---|---|
| CN | 201322816 Y | * | 10/2009 |
| JP | 2001333332 A | * | 11/2001 |
| JP | 2007108534 A | * | 4/2007 |
| KR | 20110045791 A | * | 5/2011 |

* cited by examiner

*Primary Examiner* — Sinh Tran
*Assistant Examiner* — Zhenzhen Wu
(74) *Attorney, Agent, or Firm* — Ked & Associates, LLP

(57) ABSTRACT

A camera module generally provided in a mobile terminal. The camera module includes a lens unit which is configured to accommodate at least one lens. An actuator unit is configured to fix the lens unit, and a base which is fixed by an adhesive to the bottom of the actuator. A printed circuit board (PCB) to which the base is fixed for thereby supplying electric power to the actuator unit. Either a corner of an outer side of the bottom of the actuator unit or a corner of an outer side of the top of the base is tapered.

17 Claims, 6 Drawing Sheets

CAMERA MODULE

CROSS-REFERENCE TO RELATED APPLICATIONS

This application claims priority under 35 U.S.C. §119 to Korean Application Nos. 10-2013-0110223 filed on Sep. 13, 2013, and 10-2013-0133495 and 10-2013-0133491 each filed on Nov. 5, 2013, whose entire disclosures are hereby incorporated by reference.

BACKGROUND

1. Field

The present application relates to a camera module, and in particular to a camera module which is generally installed at a mobile terminal.

2. Background

In recent years, a variety of mobile terminals are widely used, and faster wireless internet services become available. The customers of such mobile terminals are demanding various advanced functions. To meet such demands, a variety of value-added devices are increasingly installed at the mobile terminals. Among such value-added devices, there is a camera module configured to photograph a predetermined object in a form of photo or motion picture and store such an image data and edit and transmit based on the necessity of a user.

The compact-sized camera module is increasingly used at a variety of multimedia devices such as a note pad type personal computer, a camera phone, a PDA, a smart toy, etc. and is also used at an image input device such as an information terminal of a monitoring camera or a video tape recorder. As the pixel sizes of the sensor applied to the camera module decrease and the height of the module lowers, a camera module with a new mounting structure has become a serious issue, which aims to secure high durability in the mechanical components of the camera module, more specifically, in a tilt or shift-related component of a lens optic axis along with a good management against the input of impurities.

In the related camera module, the engagement of a cover can encasing a lens barrel and an actuator unit and a base disposed to install an IR filter on a printed circuit board (PCB) is implemented by an engaging protrusion which protrudes from a lower side surface of the cover can and an engaging groove formed at an upper side surface of the base and corresponding to the engaging protrusion. In such an engaging structure, the manufactured camera module may have a slight allowance due to the formations of the engaging groove of the base and the engaging protrusion of the cover can. The above-described engaging method wherein such an allowance occurs may not be proper for the use at the camera module which requires good optic axis alignment.

In order to possibly solve such a problem, the cover can and the base may be fixed using an adhesive. Since a relatively smaller area between the cover can and the base is fixed using an adhesive, the adhesive flowing out from the cover can needs to be eliminated, causing increased time and cost in terms of product productivity.

For the adhesive, a thermosetting adhesive which hardens by heat and a UV-hardened adhesive which hardens by UV may be used. In case that the thermosetting adhesive is used, the camera module is thermally treated in the oven. A predetermined material and component which are denaturized by means of heat during the above-mentioned heat treatment should be used, which causes increased cost. When the UV-hardened adhesive is used, it is difficult to properly scan for hardening the adhesive due to the compact size of the camera module and a portion where the adhesive is applied is too small. Such a problem related to the scanning of UV also occurs when performing a main adhering procedure using a thermosetting adhesive after a temporal adhering is performed using the UV-hardened adhesive.

If the adhesive flows inside of the cover can, the adhesive may contaminate other inside components such as an IR filter causing problems with the reliability and quality of products. Such a problem may occur when the fixing force by the adhesive is not enough, and the adhesive may be peeled off due to external impacts, resulting in poor durability of the product.

BRIEF DESCRIPTION OF THE DRAWINGS

The embodiments will be described in detail with reference to the following drawings in which like reference numerals refer to like elements wherein.

DETAILED DESCRIPTION

The terms used herein the specification should be understood as being same as the meanings that those who skilled in the art understand unless otherwise stated, and when the terms used in the specification collide with the common meaning of the corresponding term, such terms should be comply with the definitions of the specification.

Figure 1:
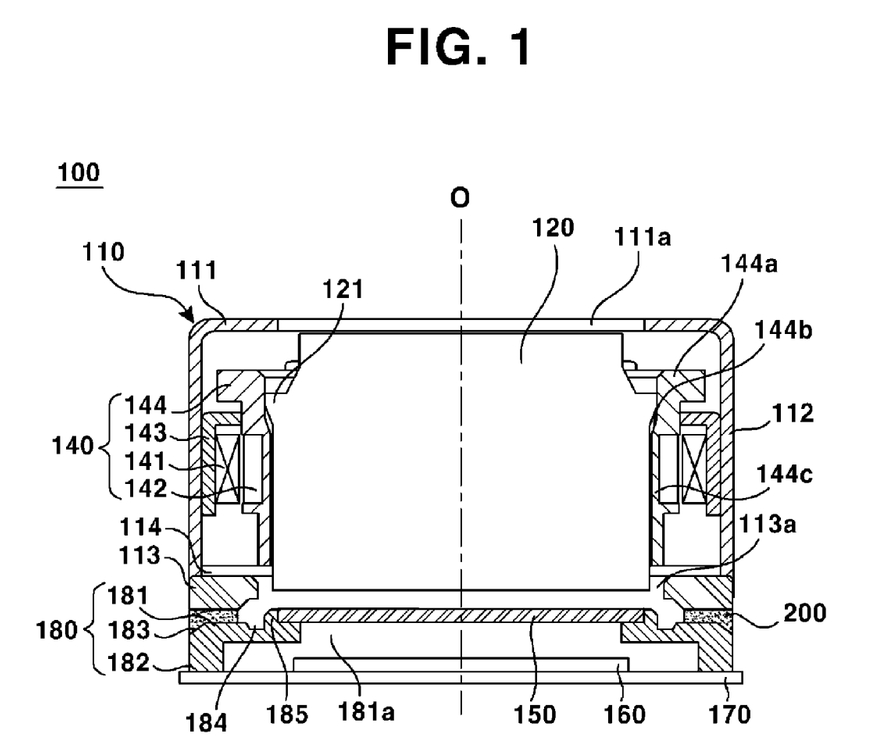
FIG. 1 is a vertical cross sectional view illustrating a camera module according to an exemplary embodiment of the present application.
Figure 2:
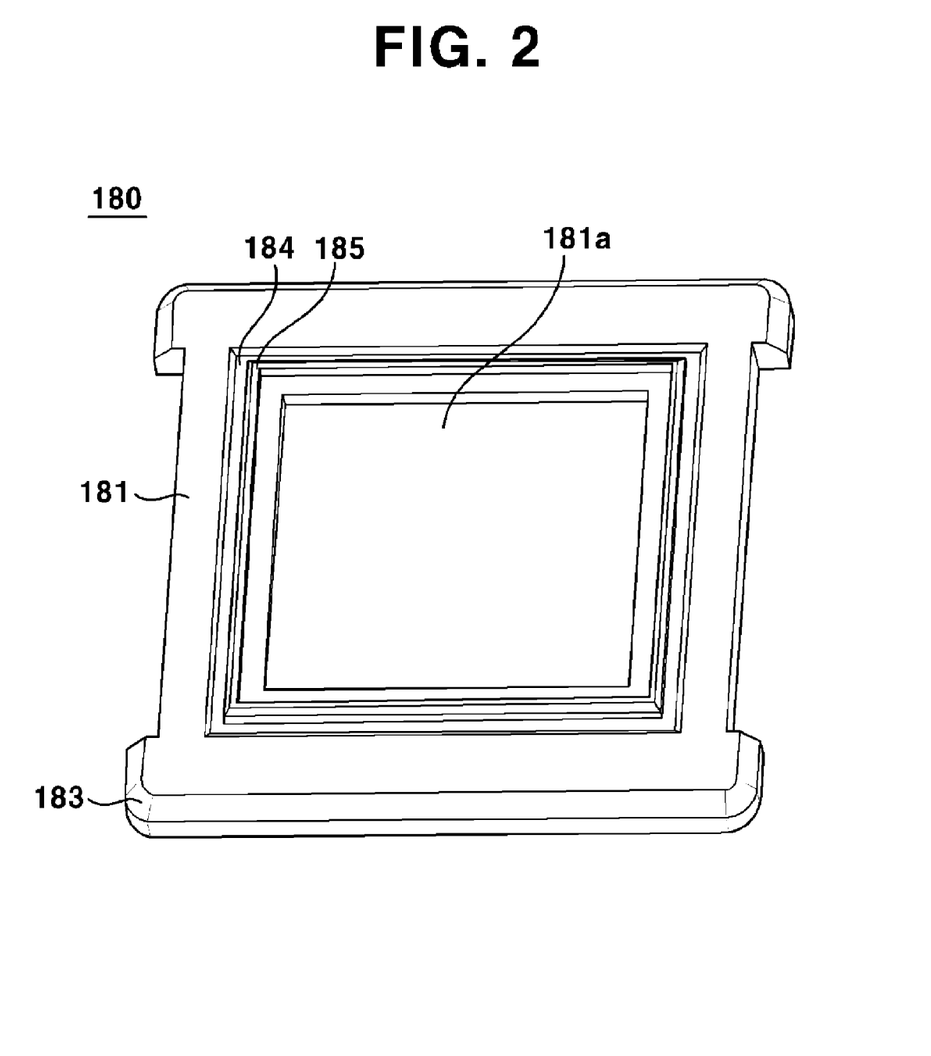
FIG. 2 is a perspective view illustrating a base according to an exemplary embodiment of FIG. 1.

FIG. 1 is a vertical cross sectional view illustrating a camera module according to an exemplary embodiment of the present application, and FIG. 2 is a perspective view illustrating a base according to an exemplary embodiment of FIG. 1. The camera module 100 includes a lens unit 120, an actuator unit 140, an image sensor 160 and a base 180. There may be further provided an IR filter 50 or a cover can 110.

The cover can 110 is configured to encase the lens unit 120 and the actuator unit 140 and defines an exterior of the camera module 100. Such a cover can 110 protects the inside components from external impacts and prevents the introduction of external contaminants. The cover can 110 also protects the components of the camera module from external electronic interferences which occurs due to the use of a cellular phone. The cover can 110 may be made from a metallic material.

The cover can 110 may be fixed in place by a yoke unit 143 itself or may be fixed by molding the yoke unit 143 at an inner side. It is apparent that the exterior of the cover can 110 may be changed based on the component accommodating environments inside of the camera. The cover can 110 may further comprise a first engaging member 113, a stopper 114, an upper side surface 111 and a side surface 112.

The printed circuit board 170 is provided at a lower side of the base 180. Such a printed circuit board 170 is configured to mount a variety of devices disposed for driving the camera module 100 and supplying electric power to drive the actuator unit 140.

The image sensor 160 may be mounted on the printed circuit board 170 to be located based on at least one lens housed in the lens unit 120 and an optic axis direction (O). Such an image sensor 160 is configured to convert an optical signal of a predetermined object incident through the lens into an electrical signal.

The lens unit 120 is housed in the actuator unit 140 and is disposed in place at a portion where corresponds to the image sensor 160. The lens unit 120 is configured to house at least one lens (not shown). The lens unit 120 may be a lens barrel which is formed as a plurality of lenses are arranged along an optic axis.

The actuator unit 140 comprises a bobbin 144 which is engaged along an outer circumferential surface of the lens barrel 120 for thereby fixing the lens barrel 120. The actuator unit 140 serves to fix the lens unit 120 inside of the bobbin 144 and adjust the focus of a predetermined image by moving the lens unit 120.

The actuator unit 140 may be configured such that the camera module 100 can perform an auto focusing function or may be configured such that the camera module 100 can perform optical image stabilization (OIS). If the actuator unit 140 is an auto focusing actuator (A.F), there may be provided a voice coil motor may be provided, but not limited thereto. Alternatively, the camera may be a fixed focusing type (F.F).

Figure 3:
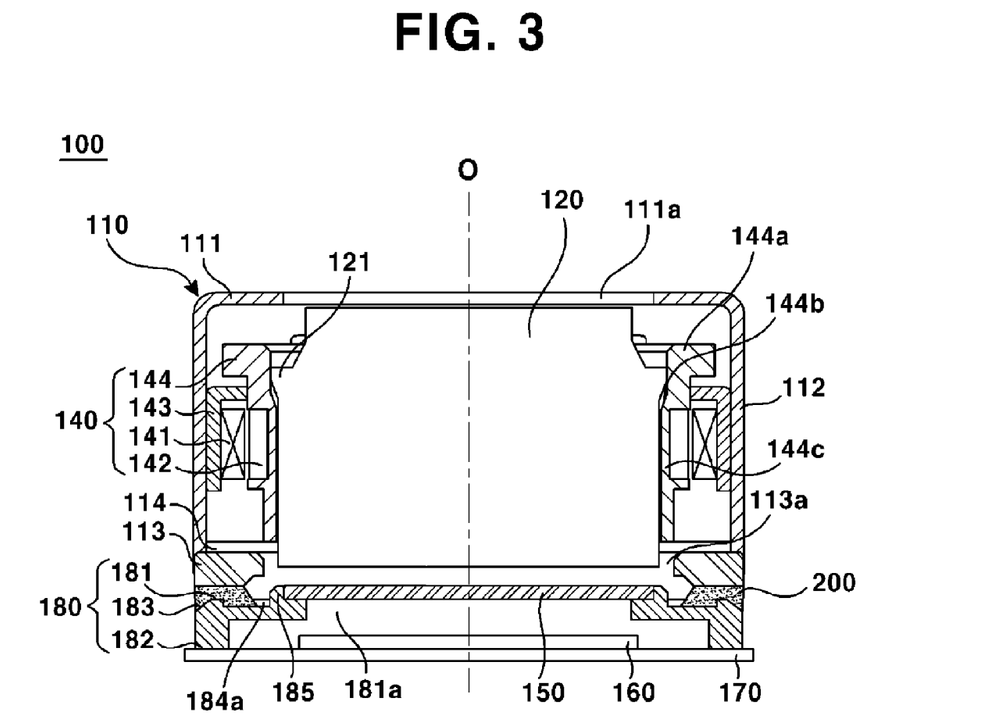
FIG. 3 is a vertical cross sectional view illustrating a camera module according to another exemplary embodiment of the present application.

In case of the auto focusing type, as illustrated in FIGS. 1 and 3, the actuator unit 140 comprises a coil unit 142 provided on an outer circumferential surface of the bobbin 144, a magnet unit 141 which is provided at a portion corresponding to the coil unit 142 in the actuator unit 140, and a yoke unit 143 configured to fix the magnet unit 141. The yoke unit may define exterior look of the actuator, instead of the cover can 110.

Electric current is applied to the coil unit 141 as a driving signal applied by the printed circuit board 170, and the bobbin 144 secured to the lens unit 120 moves upward or downward along the optic axis direction (O) by means of the magnet unit 141 which cooperates with the coil unit 141.

For the optic image stabilization (OIS) type or function, at least one lens or a lens barrel move in a direction vertical with respect to the optic axis. FIGS. 1 and 3 illustrates an occasion wherein such movement is not considered, but since part of the construction illustrated as the examples of A.F type in the drawings may be shared, such construction may be described with reference to the drawings. The actuator unit 140 comprise a first coil unit 142 provided on an outer circumferential surface of the bobbin 144, a magnet unit 141 provided at a portion corresponding to the outer circumferential surface of the first coil unit 142, a second coil unit (not shown) which is mounted on the printed circuit board disposed at the base 180 to correspond to the lower side surface of the magnet unit 141, and a yoke unit 143 configured to fix the magnet unit 141.

In case of the optical image stabilization (OIS) type, the second coil unit may be a FPCB (not shown) provided on the upper side surface of the base 180. Considering the compactness of the camera module 100, i.e., considering lowering the height in an x-axis direction which is the optic axis direction, the second coil unit may be a circularly patterned coil. The pattern coil may be directly formed at the printed circuit board or the pattern coil may be previously formed and then may be attached to the printed circuit board. On the upper surface of the base 130, a hall sensor unit (not shown) is provided at a portion corresponding to the magnet unit 141. The hall sensor unit is configured to sense the electric voltage applied to detect the movements of the magnet unit 41 and the intensity and phase of the electric current which flows through the coil and is provided to precisely control the actuator unit in cooperation with the FPCB.

The first coil unit 142 serves to move upward and downward (z-axis direction) the lens unit in the optic axis direction, and the second coil unit serves to move the lens unit in the x-axis direction and/or y-axis direction which is a direction perpendicular to the optic axis direction.

The first coil unit 142 and the second coil unit may be configured to directly receive the electric power from the printed circuit board or receive electric power by means of the printed circuit board (FPCB or PCB) since the printed circuit board (FPCB or PCB) provided as the second coil unit on top of the base 180 is electrically connected to the printed circuit board. Since the detailed method for supplying electric power to the first coil unit and the second coil unit is apparent to one of ordinary skill based on the present disclosure, the detailed descriptions thereof will be omitted.

The hall sensor unit is disposed on a straight line along with the magnet unit so as to detect any displacement in the x-axis and y-axis directions. Such a hall sensor unit is provided in closer proximity to the second coil unit rather than the magnet unit 141, but considering that the intensity of the magnetic field formed at the magnets is hundreds times larger than the intensity of the electromagnetic field formed at the coils, the effects of the second coil unit may not be considered important in terms of the detection of the movements of the magnet unit 141. In addition, the hall sensor unit may be disposed at the center of the circle of the circular type pattern coil or at the printed circuit board near the center where the pattern coil is not provided.

The IR filter 150 is provided between the image sensor 160 and the lens unit 120. The IR filter 150 is an infrared ray filter, but for example a flat plate shaped optic filter such as an imaging surface protecting cover glass, a cover glass, etc.

In order to dispose the IR filter 150, the camera module 100 comprises a base 180 between the cover can 110 and the printed circuit board 170. The IR filter 150 may be engaged at a hollow portion, namely a second opening 181a of a second engaging member 180 which is to be explained afterward, formed at the center of the base 180.

In the above-described construction, the present application may have the following optic axis (O) alignment of the camera module.

Referring to FIG. 1, the lens unit 120 and the bobbin 144 may be implemented without any thread engagement. Following the trends of requiring high performance camera modules, since a more strict error range in the optic axis (O) alignment is demanded, the thread free engaging method seems to be more effective rather than the thread-based engaging method.

The above-described thread free engaging method is implemented such a way that the lens unit 120 is inserted into the hollow portion of the bobbin 144 from top or bottom, and the optic axis alignment is performed. When the bobbin 144 is positioned where it is fixed at the lens unit 120, an adhesive is applied on the contacting surfaces between the bobbin 144 and the lens unit 120, thus forming an adhesive layer 200, by means of which the bobbin 144 and the lens unit 120 may be stably fixed.

The above-mentioned adhesive may be a thermosetting epoxy or a UV epoxy which hardens when it is exposed to heat or UV, provided that when the thermosetting epoxy is used, the bobbin 144 and the lens unit 120 may sway when the bobbin 144 and the lens unit 120 which have been aligned on the optic axis (O) move into the oven, so it is first bonded and hardened with the UV epoxy and then it is additionally bonded and hardened with thermosetting epoxy.

Alternatively the adhesive may be applied in a circular shape on the whole contacting surfaces between the bobbin 144 and the lens unit 120 or may be applied in a form of dots or lines at regular intervals.

The lens unit 120 may further comprise at its top a flange unit 121 protruding upward. The flange unit 121 is provided at the lens unit 120 so as to prevent part of the inward penetration of the adhesive and serves to make easier the optic axis (O) alignment of the bobbin 144 and the lens unit 120. The flange unit may be designed to have a stopper function when the lens barrel is assembled to the bobbin so that the lens barrel may position at a predetermined design distance with respect to the image sensor.

The bobbin 144 comprises a top portion 144a having an inner diameter same as or slightly larger than an outer diameter of the flange unit 121 of the lens unit 120, a slanted portion 144b which extends from a lower side of the top portion 144a and is slanted in an axis direction, and a bottom portion 144c which extends from a lower side of the slanted portion 144b and has an inner diameter same as or slightly larger than an outer diameter of the lens unit 120.

The lens unit 120 is inserted from the top portion 144a of the bobbin 144 and moves downward and is finally accommodated into the bottom portion 144c. The downward movement of the lens unit 120 may be limited because the flange unit 121 of the lens unit 120 is caught on the slanted portion 144b of the bobbin 144.

The slanted portion 144b of the bobbin 144 and the flange unit 121 of the lens unit 120 may have stopper functions of limiting the downward movements when the lens unit 120 is assembled to the bobbin 144. An adhesive accommodation space may be secured at top of the flange unit in such a way to limit part of the inward penetration of the adhesive.

The exemplary embodiments of the present application which will be described below may be applied where the engaging method of the bobbin 144 and the lens unit 120 is a thread free engaging method as well as where the camera module has a thread-based engaging method.

In order to obtain better optic axis (O) alignment, the actuator unit 140 and the base 180 may be implemented as follows. The cover can 110 may comprise an upper side surface 111 having at its center an exposure hole 111a through which a lens of the lens unit 120 is exposed, and a side surface 112 which extends from the upper side surface 111. The actuator unit 140 may further comprise a first engaging member 113 which is vertically formed at its lower end in an optic axis direction of the lens and has at its center a first opening 113a.

The first engaging member 113 may be formed separately from the cover can 110 or the actuator unit 140, but it may be preferable that the first engaging member 113 is formed in an integrated structure in terms of the durability.

There is further provided a stopper 114 which has a third opening with the same diameter as or larger than the diameter of the bobbin so as to limit the downward movements of the bobbin 144. Such a stopper 114 may be integrally formed with the first engaging member 113 and supports the bottom portion 144c of the bobbin 144 for thereby limiting the downward movements of the bobbin 144.

Meanwhile, the base 180 comprises a second engaging member 181 fixed at the first engaging member 113 by the adhesive layer 200 wherein a second opening 181a communicating with the first opening 113a is formed at the center, and a support member 182 which is bent and extend downward from the second engaging member 181. The support member 182 is mounted on the printed circuit board 170.

The second engaging member 181 may be provided separately from the support member 182, but it is preferred that the second engaging member 181 is integrated with the base 180 in terms of durability.

The exemplary embodiment of the present application may provide better effects in terms of external impacts and product finish quality because the first engaging member 113 and the second engaging member 181 are engaged over relatively wider area using the adhesive layer 200.

The adhesive layer 200 used to adhere the actuator unit 140 and the base 180 may be a thermosetting epoxy or UV epoxy-based adhesive which tend to harden when it is exposed to heat or UV, provided that when the thermosetting epoxy is used, the bobbin 144 and the lens unit 120 may swing when the bobbin 144 and the lens unit 120 which have been aligned on the optic axis (O) move into the oven, so it may be implemented using the UV epoxy.

The adhesive may be applied on the whole contacting surfaces of the first engaging member 113 and the second engaging member 181 or may be applied in a form of dots or lines at regular intervals.

A tapered unit 183 which is chamfered may be provided where the second engaging member 181 and the support member 182 meet each other, e.g., at the interconnection portion in an attempt to make sure that more UV can be scanned to the adhesive to make easier the applying of the adhesive and make quicker the hardening of the adhesive outside of the device. The tapered unit 183 may be formed by rounding, not by chamfering. Not illustrated in the drawings, the tapered unit 183 is not formed at the contacting surface of the second engaging member 181 and the support member. Instead of the formation of the tapered unit 183, the corner of the first engaging member 113 may be chamfered or tapered or rounded.

In order to prevent the degradation of the function of the camera module 100 when the applied adhesive penetrates into the imaging components, more specifically, into the IR filter 150, the image sensor 160, accommodated inside of the base 180, the exemplary embodiment of the present application may further comprise a recess unit 184 on the upper side surface of the second engaging member 181 so as to prevent the movements of the adhesive in the direction of the IR filter 150.

The recess unit 184 may be provided on the upper surface of the base 180, namely, on the second engaging member 181. The recess unit 184 may be formed in a ring-shaped recess surrounding the second opening 181a of the base 180. The recess 184 serves to prevent the overflow of the adhesive toward the IR filter 150 in such a way to accommodate the over inputted adhesive when forming the adhesive layer 200.

The second opening 181a of the base 180 is sealed by means of the IR filter 150. To make easier the engagement of the IR filter 150 and prevent the inward inputs of the adhesive, a vertically protruding protruding portion 185 is provided near the second opening and on an upper side surface of the second engaging member 181. In this case, on the upper side surface of the second engaging member 181, the IR filter 150 surface-contacts with an inner circumferential surface of the protruding portion 185. In the upper side surface of the second engaging member 181, the recess unit 184 may be provided outside of the protruding portion 185.

Figure 6:
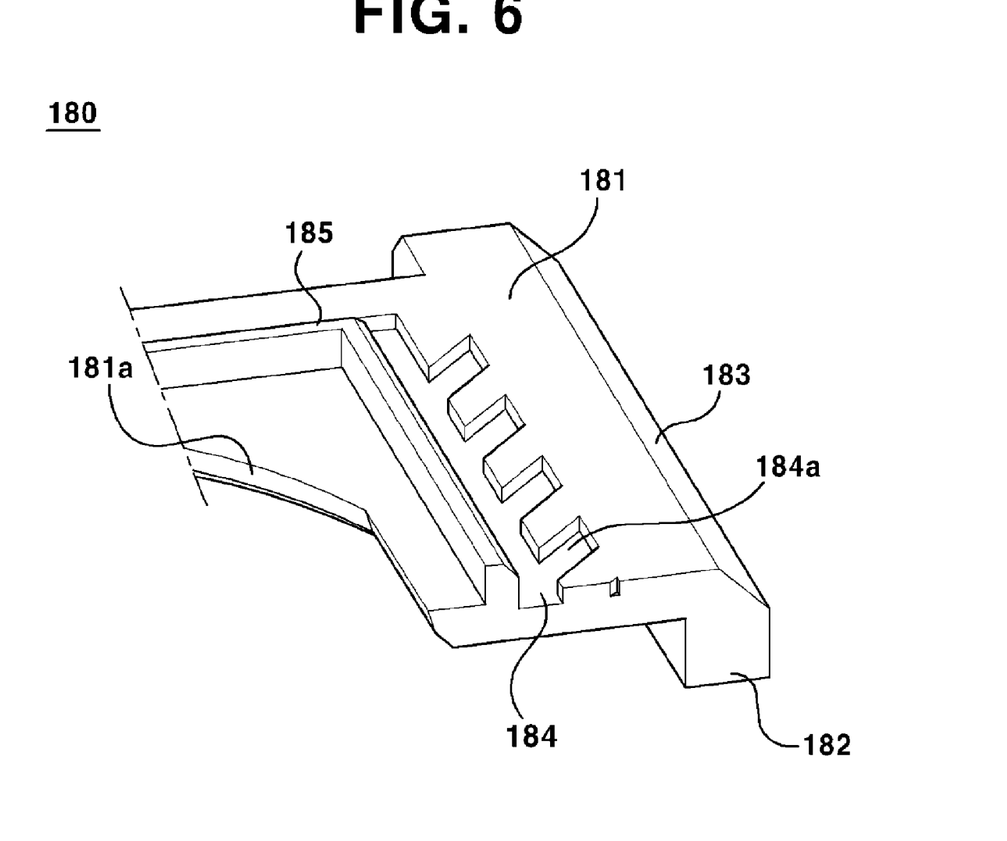
FIG. 6 is a partial perspective view illustrating a base of a camera module according to another exemplary embodiment of the present application.

The protruding portion 185 may be a ring shaped wall body or a dam which encases the surrounding of the second opening 181a of the base 180. Since such a wall body or dam serves to prevent the adhesive flowing toward the IR filter 150, it may be preferable that the height of the wall body or the dam is higher than the IR filter. Both the protruding portion 185 and the recess unit 184 serve to limit the adhesive from flowing toward the IR filter 150, which operations may be obtained in such a way that the recess unit 184 gathers the adhesive inside of itself and the protruding portion 185 blocks the inflow of the adhesive. Referring to FIGS. 1 and 6, with regard to the arrangement of the protruding portion 185 and the recess unit 184, the protruding portion 185 is provided in closer proximity to the IR filter 150, and the recess unit 184 is provided relatively farther; however alternatively their positions may be reversed.

As illustrated in FIGS. 1 and 3, as a window formed larger than the effective image region of the image sensor 160, a second opening 181a may be formed near the center of the base 180. The second opening 181a has an inner circumferential surface with a constant surface area due to the thickness of the base 180.

When the light reflected on the inner circumferential surface is transmitted to the image sensor 160, an error such as flare may occurs in the image. In order to prevent such an error, it needs to provide the second opening 181a whose inner circumferential surface does not reflect any light. Since the protrusion 185 is a wall body or a dam which is surrounded by the second opening 181a, it may be utilized to block the light which is incident toward the inner circumferential surface of the second opening 181a or absorb the light which is reflected on the inner circumferential surface of the second opening 181a.

The protrusion 180 may be provided at any place as long as the inner circumferential surface of the second opening 181a absorbs the reflection light or there is a shade by means of which light is not transmitted to the inner circumferential surface of the second opening 181a. The protruding portion 185 may be formed at the upper surface of the base 180, and more specifically, on the surface facing the cover can 110 and the lens unit 120. It may be preferable that the protruding portion 185 has a no-gloss black color so as to well absorb the light. For this, the material of the base 180 may also have a no-gloss black color or it is possible to paint for light absorption on the protruding portion 185 of the base formed through injection molding.

The adhesive layer 200 fixes the first engaging member 113 and the second engaging member 181. If the lower surface of the first engaging member 113 or the upper surface of the second engaging member 181 is sleek, adhering force may be deteriorated. In order to improve the above-mentioned problems, as illustrated in FIG. 3, a strength reinforcing grooves 184a may be formed at the upper surface of the second engaging member 181.

Figure 4:
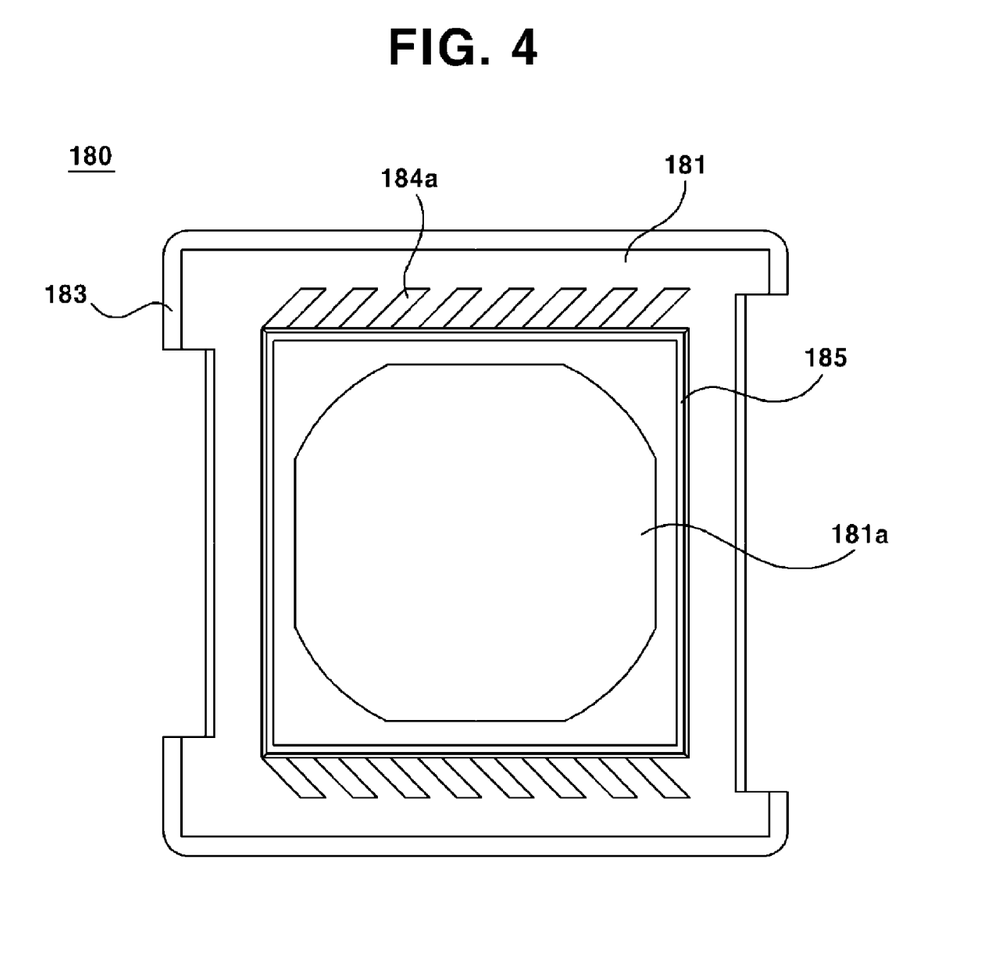
FIG. 4 is a plane view illustrating a base according to an exemplary embodiment of FIG. 3.
Figure 5:
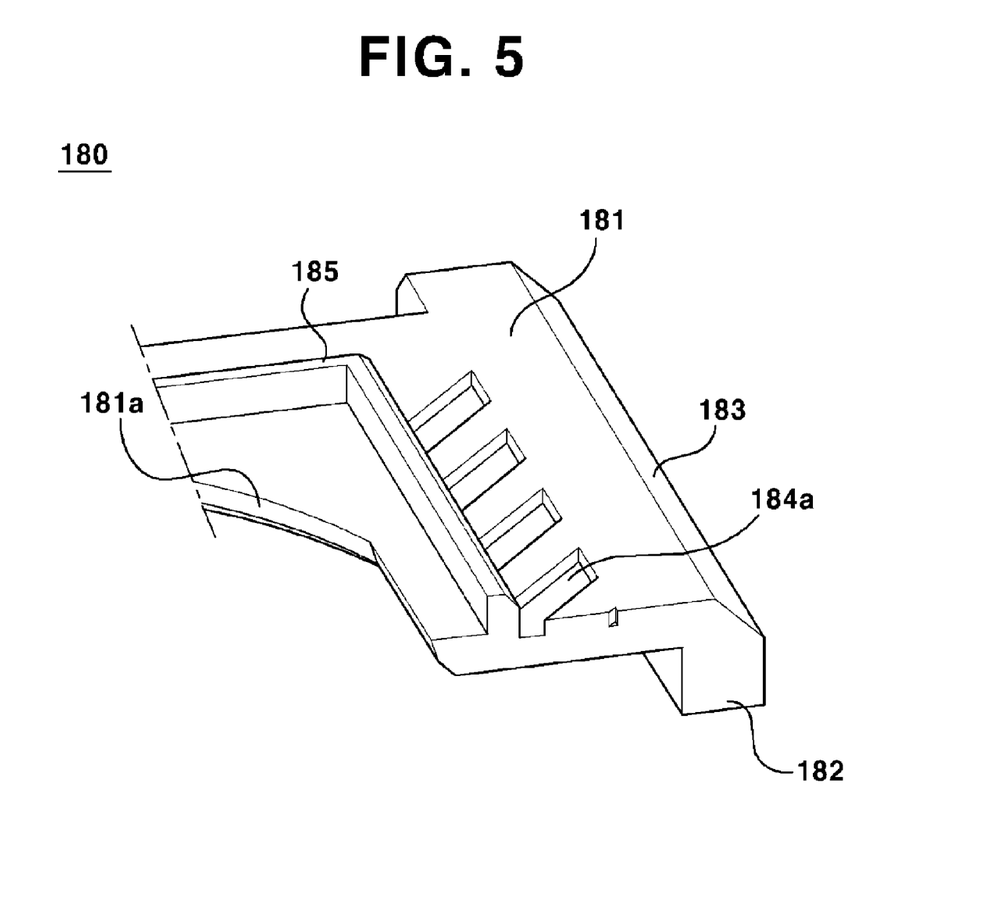
FIG. 5 is a partial perspective view illustrating a base according to an exemplary embodiment of FIG. 3.

Referring to FIGS. 4 and 5, the strength reinforcing grooves 184a may be formed in the shape of diagonal lines on the upper surface of the second engaging member 181 of the base 180. The strength reinforcing grooves 184a may be formed in the shape of zigzag lines on the upper surface of the second engaging member 181 of the base 180. Alternatively, it may be formed in a variety of shapes. The strength reinforcing grooves 184a may provide a good engaging force against horizontal external force because part of the adhesive applied so as to fix the base 180 and the engaging member 113 of the cover can 110 is inputted and hardens.

The strength reinforcing grooves 184a are formed in close proximity to the protrusion 185, but alternatively, it may be formed spaced apart from the protruding portion 185. The strength reinforcing grooves 184a may be provided together with the recess unit 184. FIG. 6 illustrates the above occasion. It may be preferable that the strength reinforcing grooves 184a are formed father than the recess unit 184 from the IR filter 150 because the adhesive is allowed to penetrate into the strength reinforcing grooves 184a, but it needs to greatly prevent the penetration of the adhesive into the recess unit 184.

Instead of the formation on the upper surface of the second engaging member 181, the strength reinforcing grooves 184a may be additionally formed at the lower surface of the first engaging member 113 together with the formation on the upper surface of the second engaging member 181. In the later case, the strength reinforcing grooves (not shown) formed at the first engaging member 113 is formed in the shape of diagonal lines crossing the strength reinforcing grooves 184a of the base 180, by means of which it is more advantageous to maintain engaging force with respect to horizontal external force.

The present exemplary embodiment of the present application makes it possible to obtain good optic axis alignment and is effective to enhance the reliability and productivity of the product by preventing the inside and outside flows of the adhesive.

Accordingly, the present application is made in an effort to improve the above-described problems. It is an object of the present application to provide a camera module which is configured in a structure capable of scanning enough UV so as to harden an adhesive while fixing, using an adhesive, a cover can and a base.

It is another object of the present application to provide a camera module which makes it possible to prevent other components from being contaminated by an adhesive which may penetrate inside of the cover can.

It is further another object of the present application to provide a camera module which is capable of enhancing an engaging force of an adhesive.

The other objects, specific advantages and new features of the present application will be apparent by means of the following detailed descriptions and exemplary embodiments related to the accompanying drawings.

To achieve the above objects, there is provided a camera module, comprising a lens unit which is configured to accommodate at least one lens; an actuator unit which is configured to fix the lens unit; a base which is fixed by an adhesive to the bottom of the actuator; and a printed circuit board (PCB) to which the base is fixed for thereby supplying electric power to the actuator unit, wherein either a corner of an outer side of the bottom of the actuator unit or a corner of an outer side of the top of the base is tapered.

In the camera module according to the present application, the actuator unit comprises a first engaging member at the center of which a first opening is formed, and the base comprises a second engaging member at the center of which a second opening is formed and which is fixed by the adhesive to the first engaging member, and a support member which is bent from the second engaging member and extends downwardly, and a connection portion interconnecting the second engaging member and the support member is chamfered for thereby forming a tapered portion.

In the camera module according to the present application, the actuator unit comprises a first engaging member at the center of which a first opening is formed, and the base comprises a second engaging member at the center of which a second opening is formed and which is fixed by the adhesive to the first engaging member, and a support member which is bent from the second engaging member and extends downwardly, and a connection portion interconnecting the second engaging member and the support member is rounded for thereby forming a tapered portion.

In the camera module according to the present application, there is preferably further provided a protruding portion which is integral with the base and protrudes for thereby preventing the adhesive from entering into the insides of the actuator unit and the base.

In the camera module according to the present application, there is further provided an IR (Infrared) filter which is installed at the center of the base. Here, the protruding portion is preferably formed in a ring shape around the IR filter. In addition, the protruding portion preferably has a height higher than the thickness of the IR filter. The protruding portion is made from a no-gloss black color material or the protruding portion is painted in a no-gloss black color.

In the camera module according to the present application, the base comprises a plurality of strength reinforcing grooves at either an upper side surface of the base or at a lower end surface of the actuator unit. The plurality of the strength reinforcing grooves is preferably formed in the shape of diagonal lines. The plurality of the strength reinforcing grooves is formed in the shape of zigzag lines.

In the camera module according to the present application, the actuator unit comprises a first engaging member at the center of which a first opening is formed, and the base comprises a second engaging member at the center of which a second opening is formed and which is fixed by the adhesive to the first engaging member, and the strength reinforcing grooves are formed either at a lower surface of the first engaging member or at an upper surface of the second engaging member. At this time, when the strength reinforcing grooves are formed at both sides of the actuator unit and the base, the strength reinforcing grooves of the both side are arranged to cross each other.

In the camera module according to the present application, the actuator unit comprises a bobbin which is configured to fix the lens unit; a coil unit which is provided at an outer circumferential surface of the bobbin; a magnet unit which is provided at a portion corresponding to the coil unit; and a yoke unit which is configured to fix the magnet unit.

According to the present application, a UV-hardened adhesive may be quickly hardened in such a way that a tapered configuration is formed at an outer corner of a lower side of an actuator unit or at an outer corner of an upper side of a base, and UV may be scanned into a space obtained by means of the tapered configuration.

Also, the present application is characterized in that even when the amount of the adhesive applied between the actuator unit and the base is larger than expected, the surplus amount of the adhesive can be accommodated in the recess unit. Albeit there being a help of the recess unit, if the adhesive is still larger in amount, such surplus adhesive may not overflow the protruding portion. So, it is possible to prevent the inside components of the actuator unit or the base from being contaminated by the adhesive, while enhancing the durability and quality of products.

In the present application, since the strength reinforcing grooves are formed at the upper surface of the base and the lower surface of the actuator unit, and part of the adhesive penetrates into the strength reinforcing groove, the durability of the product may be enhanced thanks to the enhanced engaging force with the cover can.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A camera module, comprising:
a printed circuit board (PCB);
an image sensor disposed on the PCB;
a base disposed on an upper surface of the PCB, wherein the base comprises an upper surface and a tapered portion recessed from the upper surface of the base, wherein the tapered portion is provided along a circumferential surface of the base;
an actuator unit disposed at the upper surface of the base and comprising a first engaging member;
a lens unit disposed at an upper side of the PCB and coupled to the actuator unit, wherein the upper surface of the base is positioned lower than a bottom end of the lens unit;
an adhesive disposed between the upper surface of the base and a bottom surface of the first engaging member, wherein the actuator unit is coupled to the base; and
a filter disposed on the base between the image sensor and the lens unit, wherein a lateral surface of the filter is covered with a protrusion portion protruded from the upper surface of the base,
wherein the base comprises a recess unit recessed from the upper surface of the base and disposed between the protrusion portion and the tapered portion, wherein a recessed surface of the recess unit is disposed at a position lower than a bottom surface of the filter,
wherein the adhesive comprises a portion horizontally overlapped with the filter, and
wherein the bottom end of the lens unit is horizontally overlapped with the first engaging member of the actuator unit.

2. The camera module of claim 1, wherein the tapered portion is downwardly recessed gradually from an inner side of the upper surface of the base to the circumferential surface of the base.

3. The camera module of claim 1, wherein the tapered portion is chamferedly or roundly formed.

4. The camera module of claim 1, further comprising:
an opening penetratedly formed in the base,
wherein the filter disposed at the base is overlapped with the opening in a direction of an optical axis of the lens unit.

5. The camera module of claim 1, wherein the protrusion portion has a height greater than a thickness of the filter.

6. The camera module of claim 1, wherein the protrusion portion is made from a no-gloss black color material.

7. The camera module of claim 1, wherein the protrusion portion is painted in a no-gloss black color.

8. The camera module of claim 1, further comprising a plurality of first strength reinforcing grooves downwardly recessed from the upper surface of the base.

9. The camera module of claim 8, wherein the plurality of the first strength reinforcing grooves are formed in a shape of diagonal lines.

10. The camera module of claim 8, wherein the plurality of the first strength reinforcing grooves are formed in a shape of zigzag lines.

11. The camera module of claim 8, further comprising a plurality of second strength reinforcing grooves upwardly recessed from the bottom surface of the actuator unit.

12. The camera module of claim 11, wherein the first strength reinforcing grooves and the second strength reinforcing grooves are arranged to cross each other.

13. The camera module of claim 1, wherein the actuator unit includes:
a bobbin that fixes to the lens unit;
a coil unit provided at an outer circumferential surface of the bobbin;
a magnet unit provided at a portion corresponding to the coil unit; and
a yoke unit that fixes to the magnet unit.

14. The camera module of claim 1, wherein the recess unit is provided surrounding the protrusion portion.

15. A camera module, comprising:
a printed circuit board (PCB);
an image sensor disposed on the PCB;
a base provided on an upper surface of the PCB;
an actuator unit comprising a first engaging member provided at an upper surface of the base;
a lens unit including at least one lens and coupled to the actuator unit, wherein the lens unit is not overlapped with the base in a direction vertical to an optical axis of the lens unit;
an adhesive contacted with the upper surface of the base and a bottom surface of the first engaging member;
a tapered portion downwardly recessed from the upper surface of the base, wherein the tapered portion is provided along a circumferential surface of the base;
a filter disposed on the upper surface of the base between the image sensor and the lens unit;
a protrusion portion protruded from the upper surface of the base, wherein the protrusion portion covers a lateral surface of the filter; and
a recess unit recessed from the upper surface of the base and disposed between the protrusion portion and the tapered portion, wherein a recessed surface of the recess unit is disposed at a position lower than a bottom surface of the filter,
wherein the adhesive comprises a portion horizontally overlapped with the filter, and
wherein the bottom end of the lens unit is horizontally overlapped with the first engaging member of the actuator unit.

16. An optical apparatus, comprising:
a printed circuit board (PCB);
an image sensor disposed on the PCB;
a base disposed on an upper surface of the PCB, wherein the base comprises an upper surface and a tapered portion recessed from the upper surface of the base,
wherein the tapered portion is provided along a circumferential surface of the base;
an actuator unit disposed at the upper surface of the base and comprising a first engaging member;
a lens unit disposed at an upper side of the PCB and coupled to the actuator unit, wherein the upper surface of the base is positioned lower than a bottom end of the lens unit;
an adhesive disposed between the upper surface of the base and a bottom surface of the first engaging member, wherein the actuator unit is coupled to the base; and
a filter disposed on the base between the image sensor and the lens unit,
wherein a lateral surface of the filter is covered with a protrusion portion protruded from the upper surface of the base,
wherein the base comprises a recess unit recessed from the upper surface of the base and disposed between the protrusion portion and the tapered portion, wherein a recessed surface of the recess unit is disposed at a position lower than a bottom surface of the filter,
wherein the adhesive comprises a portion horizontally overlapped with the filter, and
wherein the bottom end of the lens unit is horizontally overlapped with the first engaging member of the actuator unit.

17. The camera module of claim 1, wherein the recess unit includes a inclined surface connecting the upper surface of the base and the recessed surface of the recess unit, an obtuse angle is formed by the inclined surface of the recess unit and the upper surface of the base, and an obtuse angle is formed by the inclined surface of the recess unit and the recessed surface of the recess unit, and
wherein the inclined surface of the recess unit faces a direction different from a direction which the tapered portion faces.

* * * * *